(12) United States Patent
Kim et al.

(10) Patent No.: US 11,048,662 B2
(45) Date of Patent: Jun. 29, 2021

(54) USER DEVICE INCLUDING STORAGE DEVICE AND TRIM MANAGEMENT METHOD THEREOF

(71) Applicant: Samsung Electronics Co., Ltd., Suwon-si (KR)

(72) Inventors: Kyung Ho Kim, Seoul (KR); Seungyeun Jeong, Anseong-si (KR); Dae-Jin Kim, Hwaseong-si (KR); Sang-Jin Oh, Suwon-si (KR); Hwasoo Lee, Bucheon-si (KR); Hyejeong Jang, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 898 days.

(21) Appl. No.: 15/610,810

(22) Filed: Jun. 1, 2017

(65) Prior Publication Data

US 2018/0129674 A1    May 10, 2018

(30) Foreign Application Priority Data

Nov. 7, 2016  (KR) ........................ 10-2016-0147674

(51) Int. Cl.
*G06F 16/16* (2019.01)
*G06F 16/18* (2019.01)

(52) U.S. Cl.
CPC ........ *G06F 16/162* (2019.01); *G06F 16/1847* (2019.01)

(58) Field of Classification Search
None
See application file for complete search history.

(56) References Cited

U.S. PATENT DOCUMENTS

| | | | |
|---|---|---|---|
| 8,180,931 B2* | 5/2012 | Lee | .................. G06F 3/0613 710/14 |
| 8,327,065 B2 | 12/2012 | Yano et al. | |
| 8,904,092 B2 | 12/2014 | Tucek | |
| 9,053,007 B2 | 6/2015 | Nishikubo | |
| 9,134,918 B2 | 9/2015 | Yurzola et al. | |
| 9,323,667 B2 | 4/2016 | Bennett | |
| 2014/0281151 A1* | 9/2014 | Yu | ........................ G06F 1/30 711/103 |
| 2016/0055198 A1 | 2/2016 | Park et al. | |

FOREIGN PATENT DOCUMENTS

JP    H09-022596    1/1997
JP    2015053075 A    3/2015

* cited by examiner

*Primary Examiner* — Giuseppi Giuliani
(74) *Attorney, Agent, or Firm* — Harness, Dickey & Pierce, P.L.C.

(57) ABSTRACT

A trim management method for a storage device includes activating, by a processor configured by an application program, a pattern check function of a device driver, requesting, by the processor configured by the application program, a file system to write a file of a specified pattern, converting, by the processor configured by the file system, the file to management unit data of the storage device, transmitting, by the processor configured by the file system, the management unit data to the device driver, checking, by the processor configured by the device driver, whether a data pattern of the management unit data is the same as the specified pattern, and transmitting, by the processor configured by the device driver, a trim command for trimming a storage area corresponding to the management unit data, to the storage device based on results of the checking.

17 Claims, 14 Drawing Sheets

USER DEVICE INCLUDING STORAGE DEVICE AND TRIM MANAGEMENT METHOD THEREOF

CROSS-REFERENCE TO RELATED APPLICATIONS

A claim for priority under 35 U.S.C. § 119 is made to Korean Patent Application No. 10-2016-0147674 filed Nov. 7, 2016, in the Korean Intellectual Property Office, the entire contents of which are hereby incorporated by reference.

BACKGROUND

The inventive concepts described herein relate to semiconductor memory devices, and more particularly to user devices including the storage device and trim management methods thereof.

A flash memory device is a type of nonvolatile memory device. The flash memory device has relatively low power consumption, relatively high integration, a relative small size, and relatively light weight. In recent years, as portable information devices (e.g., a smartphone, a tablet PC, or a digital camera) are increasingly used, the flash memory device are widely used as a data storage device.

In the case where a file stored in the storage device is deleted by a host, the host may invalidate the deleted file by processing metadata associated with the deleted file. However, the deleted file marked as invalid is actually present in the storage device. The storage device may recognize and manage the invalid data as valid data. Accordingly, the invalid data may reduce performance of the storage device and an available memory capacity. The host may transmit a 'trim command' to the storage device to actually delete the invalid data in the storage device. The trim command may include information (e.g., address information) for designating an area to be deleted.

Host equipment may include various computer systems on which one or more storage devices (e.g., a solid state drive SSD) including flash memory devices are mounted. For example, the storage device may be connected to a server, a data center, a personal computer (PC), or the like. The host equipment may be driven by various operating systems. A memory management function of the storage device may be restricted according to types of operating systems of the host equipment. For example, execution of the trim command may be greatly influenced according to characteristics of an operating system, a file system, or a host.

Accordingly, a technology that supports a trim operation of the storage device, regardless of the characteristics of the operating system, the file system, or the host, is desired.

SUMMARY

Some example embodiments of the inventive concepts provide a trim method of a storage device that does not depend on an operating system, a file system, or a host.

According to an example embodiment of the inventive concepts, a trim management method of a storage device includes activating, by at least one processor configured by an application program, a pattern check function of a device driver, requesting, by the at least one processor configured by the application program, a file system to write a file of a specified pattern, converting, by the at least one processor configured by the file system, the file to management unit data of the storage device, transmitting, by the at least one processor configured by the file system, the management unit data to the device driver, checking, by the at least one processor configured by the device driver, whether a data pattern of the management unit data is the same as the specified pattern, and transmitting, by the at least one processor configured by the device driver, a trim command for trimming a storage area corresponding to the management unit data, to the storage device based on results of the checking.

According to an example embodiment of the inventive concepts, a user device includes a host and a storage device. The host includes one or more processors and a working memory, the working memory including an application program, a file system, and a device driver loaded thereon, the application program configuring the one or more processors to activate or deactivate a pattern check function of the device driver to generate a trim command and request the device driver to write specified data through the file system, the device driver configuring the one or more processors to generate the trim command if a pattern of the specified data provided from the file system while the pattern check function is active is same as the specified pattern. The one or more processors is configured to generate the trim command based on driving the application program, the file system, and the device driver, and transmit the trim command to a storage device in communication with the host. The storage device is configured to trim a selected memory area in response to the trim command.

According to an example embodiment of the inventive concepts, a trim management method for a storage device in communication with a host connected thereto, the host including a memory configured to store computer-readable instructions and at least one processor configured to execute the computer-readable instructions such that the one or more processors are configured to perform the trim management method, includes detecting, by the at least one processor, a trim condition, transmitting, by the at least one processor, a pattern check start command to the storage device, if the trim condition is detected, transmitting, by the at least one processor, a trim pattern to the storage device, detecting, by the at least one processor, a stop condition, and generating, by the at least one processor, a pattern check stop command based the stop condition, transmitting, by the at least one processor, the pattern check stop command to the storage device, performing, by a controller included in the storage device, at least one pattern check operation in response to the pattern check start command received from the host until the pattern check stop command is received from the host, and performing at least one trim operation based on results of the at least one pattern check operation.

BRIEF DESCRIPTION OF THE DRAWINGS

The above and other objects and features will become apparent from the following description with reference to the following figures, wherein like reference numerals refer to like parts throughout the various figures unless otherwise specified, and wherein.

DETAILED DESCRIPTION

Figure 1:
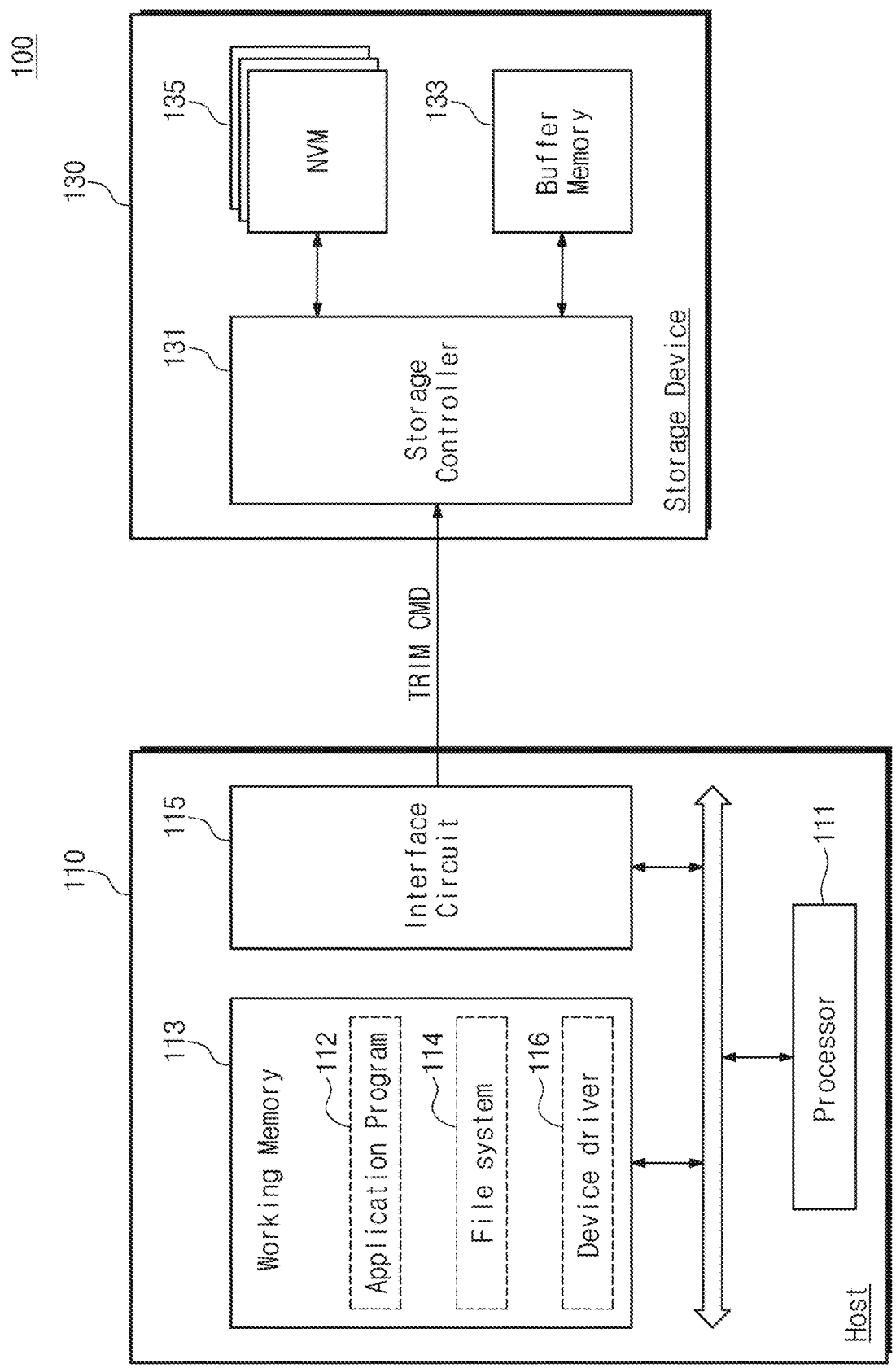
FIG. 1 is a block diagram illustrating a user device, according to an example embodiment of the inventive concepts.

It is to be understood that both the foregoing general description and the following detailed description are provided as examples, for illustration and not for limiting the scope of the inventive concepts. Reference will now be made in detail to the present example embodiments of the inventive concepts, that are illustrated in the accompanying drawings. Wherever possible, the same reference numerals are used in the drawings and the description to refer to the same or like parts.

Below, a solid state driver using a flash memory device will be used as an example of a storage device to describe features and functions of the inventive concepts. However, one skilled in the art may easily understand other features and performances from the information disclosed herein. The inventive concepts may be implemented or applied through other example embodiments. In addition, the detailed description may be changed or modified according to view points and applications without departing from the claims, the scope and spirit, and any other purposes of the inventive concepts.

FIG. 1 is a block diagram illustrating a user device, according to an example embodiment of the inventive concepts. Referring to FIG. 1, a user device 100 may include a host 110 and a storage device 130. The host 110 may provide the storage device 130 with a trim command TRIM CMD that is determined by a device driver 116 without depending on information provided by a file system 114. This will be described in more detail below.

The host 110 may read or write data from or to the storage device 130. The host 110 may write data to the storage device 130 or may generate a command CMD for reading data stored in the storage device 130. The host 110 may generate the trim command TRIM CMD for managing performance and life cycle of the storage device 130. The host 110 may perform a trim management operation under controls of an application program 112 and the device driver 116. Further, the host 110 may provide the storage device 130 with the trim command TRIM CMD, which is generated as the result of the trim management operation.

According to an example embodiment of the inventive concepts, the host 110 may include a processor 111, a working memory 113, and an interface circuit 115. The application program 112, the file system 114, the device driver 116, or the like may be loaded on the working memory 113. Further, a variety of software that is driven in the host 110 may be loaded on the working memory 113.

The processor 111 may execute a variety of software loaded on the working memory 113. The processor 111 may execute an operating system (OS), the application program 112, and the like. The processor 111 may be a homogeneous multi-core processor or a heterogeneous multi-core processor.

The application program 112, the file system 114, and the device driver 116, which are to be executed by the processor 111, or data to be processed may be loaded on the working memory 113. Furthermore, a function such as an input/output scheduler, which manages a queue associated with a command to be transmitted to the storage device 130, may be loaded on the working memory 113.

The interface circuit 115 may provide a physical connection between the host 110 and the storage device 130. The device driver 116 may be provided according to protocol or policy of the interface circuit 115. The interface circuit 115 may convert a command, an address, data, and the like, which correspond to various access requests issued from the host 110, to be suitable for interfacing with the storage device 130. The interface circuit 115 may include at least one of various protocols (e.g., universal serial bus (USB), small computer system interface (SCSI), PCI express, ATA, parallel ATA (PATA), serial ATA (SATA), or serial attached SCSI (SAS)).

The storage device 130 may perform various requested operations (e.g., access to a nonvolatile memory device 135 in response to a command provided from the host device 110). The storage device 130 may perform a trim operation on the selected area based on the trim command TRIM CMD provided from the host 110. The trim operation may be regarded as an operation to physically erase a memory area designated according to an address included in the trim command TRIM CMD. The memory area in which invalid data is present may be reduced due to the trim command TRIM CMD. Accordingly, the number of free blocks that are immediately available when write operation is requested may be increased due to the trim operation. For example, the storage device 130 may include a storage controller 131, a buffer memory 133, and the nonvolatile memory device 135.

The storage controller 131 may provide interfacing between the host 110 and the storage device 130. The storage controller 131 may physically erase the selected area of the nonvolatile memory device 135 in response to the trim command TRIM CMD provided from the host 110. A detailed operation of the storage controller 131 will be described in detail with reference to accompanying drawings.

According to the above-mentioned description, the user device 100 may generate the trim command to be transmitted to the storage device 130 without depending on the file system 114. Accordingly, the storage device 130 having relatively high versatility may be implemented in various operating systems or file system environments.

Figure 2:
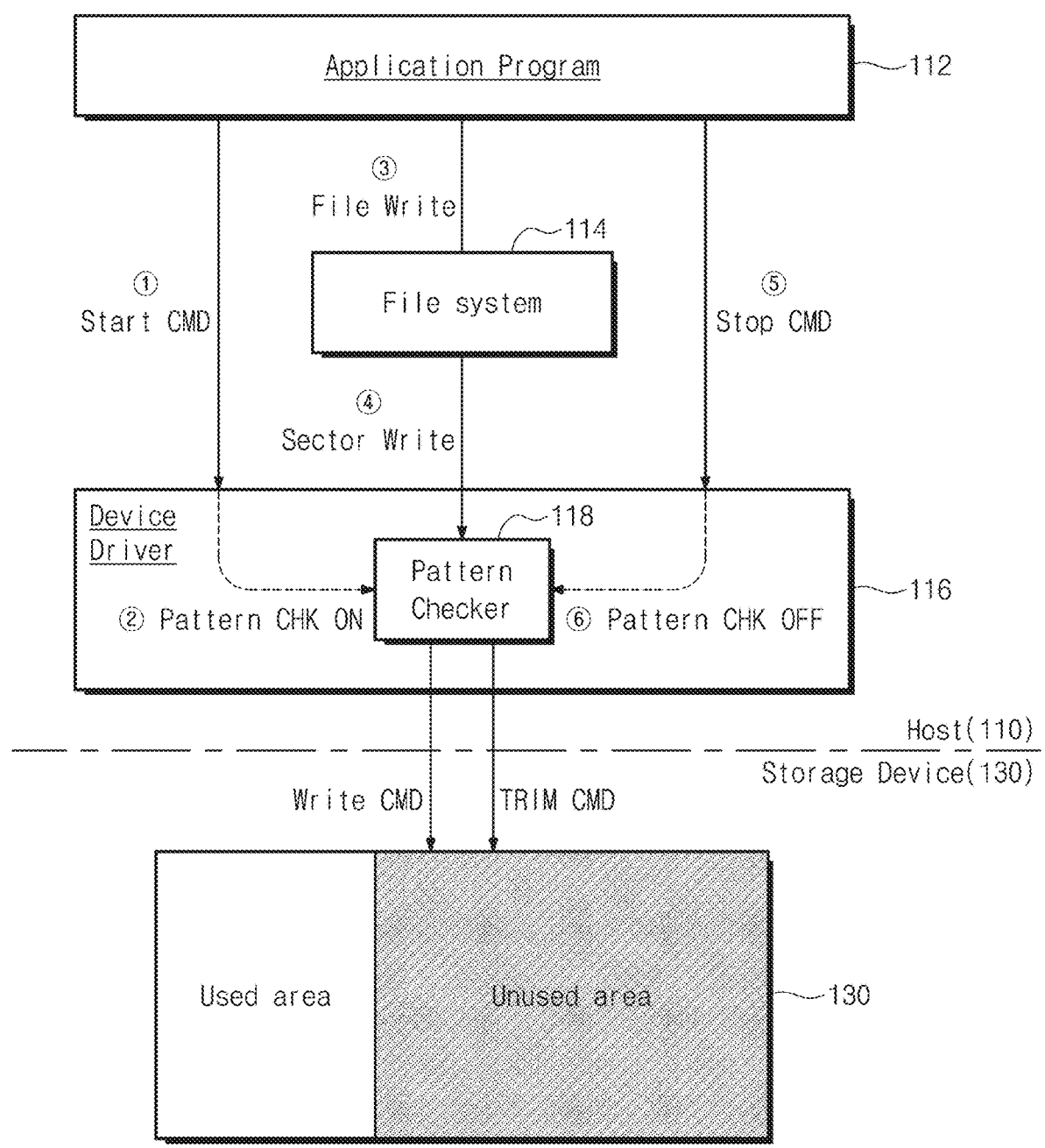
FIG. 2 is a drawing illustrating a trim operation in a host, according to an example embodiment of the inventive concepts.

FIG. 2 is a drawing illustrating a trim operation in a host 110, according to an example embodiment of the inventive concepts. A trim method performed under controls of the application program 112 and the device driver 116 will be described with reference to FIG. 2.

The application program 112 may be a program for managing the storage device 130. For example, the application program 112 may be provided as dedicated software for controlling the storage device 130. According to an example embodiment of the inventive concepts, the application program 112 does not obtain address information from the file system 114 to provide a trim command TRIM CMD. Instead, to perform the trim operation, the application program 112 may provide the device driver 116 with a start command Start CMD for starting the trim operation and a stop command Stop CMD for ending the trim operation. Further, the application program 112 may request the file system 114 to write a file of a specified pattern.

The file system 114 may be defined as a set of an abstract data structure for hierarchically storing, searching for, accessing, or manipulating data in an operating system (OS) layer. That is, the file system 114 may convert data of a file unit, which a high-level program such as the OS or the application program 112 requests to access, to data of a unit that is manageable by the device driver 116. When receiving a write request of a specified file from the application program 112, the file system 114 may select an unused area of the storage device 130. Further, the file system 114 may write the write-requested file in the selected area of the storage device 130. According to an example embodiment of the inventive concepts, the file system 114 may transmit the data (e.g., Ox00) of a specified pattern, which the application program 112 requests the file system 114 to write, to the device driver 116.

The device driver 116 may be a control module that controls the storage device 130 at an OS level of the host 110. If access to a memory is requested by a user or from the application programs 112, the device driver 116 may be called. The device driver 116 may be implemented with a software module of kernels for controlling the storage device 130.

According to an example embodiment of the inventive concepts, the device driver 116 may include a pattern checker 118. The pattern checker 118 may compare whether data write-requested from the file system 114 is a specified pattern (e.g., Ox00). The device driver 116 may generate the trim command TRIM CMD or a write command Write CMD, which are associated with an area in which the write-requested data is written, based on the comparison result. The device driver 116 may turn on the pattern checker 118 in response to the start command Start CMD provided from the application program 112. The device driver 116 may turn off the pattern checker 118 in response to the stop command Stop CMD provided from the application program 112. Hereinafter, the pattern checker 118 may be provided as a software module included in the device driver 116. However, the pattern checker 118 may be implemented with a variety of hardware or algorithms.

The process for generating the trim command under control of the application program 112, the file system 114, and the device driver 116 is as follows.

In operation ①, when an event for requesting the trim operation, the application program 112 may transmit the start command Start CMD to the device driver 116. The start command Start CMD may refer to a command for activating generation of the trim command TRIM CMD of the device driver 116.

In operation ②, the device driver 116 may activate a function of the pattern checker 118 in response to a request of the application program 112. That is, the device driver 116 may turn on the pattern checker 118 in response to the start command Start CMD from the application program 112. When the pattern checker 118 is turned on, the pattern checker 118 may determine whether data write-requested by the device driver 116 is the same as a specified pattern. The specified pattern may be set in advance or may be chosen according to a rule.

Next, in operation ③, the application program 112 may request the file system 114 to write a file of the specified pattern, which may be defined in advance or chosen according to a rule. That is, the application program 112 may request data of the specified pattern (e.g., Ox00) from the file system 114. For the trim operation, the specified pattern write-requested by the file system 114 may be stored in the pattern checker 118, which has been turned on in the device driver 116. The specified pattern stored in the pattern checker 118 may be changed or updated by the application program 112.

In operation ④, the file system 114 may convert the specified pattern data to data of a management unit of the storage device 130, and may send a write request of the converted data to the device driver 116, in response to a file write request of the application program 112. The file system 114 may manage information about the unused area of the storage device 130. Accordingly, the file system 114 may convert a write request of a file unit to a write request of a data unit (e.g., a sector unit) that the storage device 130 recognizes. When one file is requested to be written, the file system 114 may divide the file into a plurality of sector units and may allocate the divided sectors to the unused area of the storage device 130. The file system 114 may provide the device driver 116 with data corresponding to the divided sectors and an address generated as results of the allocation together with the write request.

The device driver 116 may receive the write-requested data from the file system 114. In this case, the turned-on pattern checker 118 may compare the received data with the specified pattern, which may be defined in advance or chosen according to a rule. If data provided from the file system 114 is the same as the specified pattern, the device driver 116 may generate the trim command TRIM CMD for processing the unused area of the storage device 130 corresponding to the received data. However, if the data provided from the file system 114 is not the same as the specified pattern, the device driver 116 may generate the write command Write CMD for programming the received data in the storage device 130. The trim command TRIM CMD or the write command Write CMD may be transmitted to the storage device 130 in real time immediately when write-requested. However, the application program 112 may not transmit the write command Write CMD or the trim command TRIM CMD to the storage device 130 until a size of the write-requested data satisfies a specified size (e.g., a reference or threshold size). In some example embodiments, when the stop command Stop CMD is provided from the application program 112, the device driver 116 may transmit the trim command TRIM CMD or the write command Write CMD to the storage device 130. However, the transmission time point of the trim command TRIM CMD or the write command Write CMD is not limited to the above-mentioned example embodiment.

In operation ⑤, the application program 112 may transmit the stop command Stop CMD for ending the trim operation to the device driver 116. The operation of the pattern checker 118 in the device driver 116 requires a lot of resources to compare the data. Accordingly, when the pattern checker 118 is turned on and the trim operation is activated, performance of the host 110 may be influenced. Thus, when it is determined that the trim operation is sufficiently executed, the application program 112 may transmit the stop command Stop CMD to the device driver 116 in view of performance or power consumption of the host 110.

In operation ⑥, the device driver 116 may turn off the pattern checker 118. When the pattern checker 118 is turned off, the comparison operation of the write-requested data and the specified pattern for the trim operation may be stopped. Further, when the pattern checker 118 is turned off, the device driver 116 may transmit the write command Write CMD to the storage device 130 regardless of a pattern of the write-requested data.

According to the above example embodiment of the inventive concepts, a method for generating the trim command by the application program 112 and the device driver 116 is described. The application program 112 does not obtain separate address information for the trim operation of the storage device 130 from the file system 114. For the trim operation, the application program 112 may request the device driver 116 to start and stop the trim operation and only needs to transmit the file write-request of the specified pattern to the file system 114. Furthermore, the device driver 116 may transmit the trim command or the write command on the memory area of the storage device 130 based on the pattern of the data write-requested from the file system 114. Such software structure may enable a trim operation that does not greatly depend on the file system 114.

Figure 3:
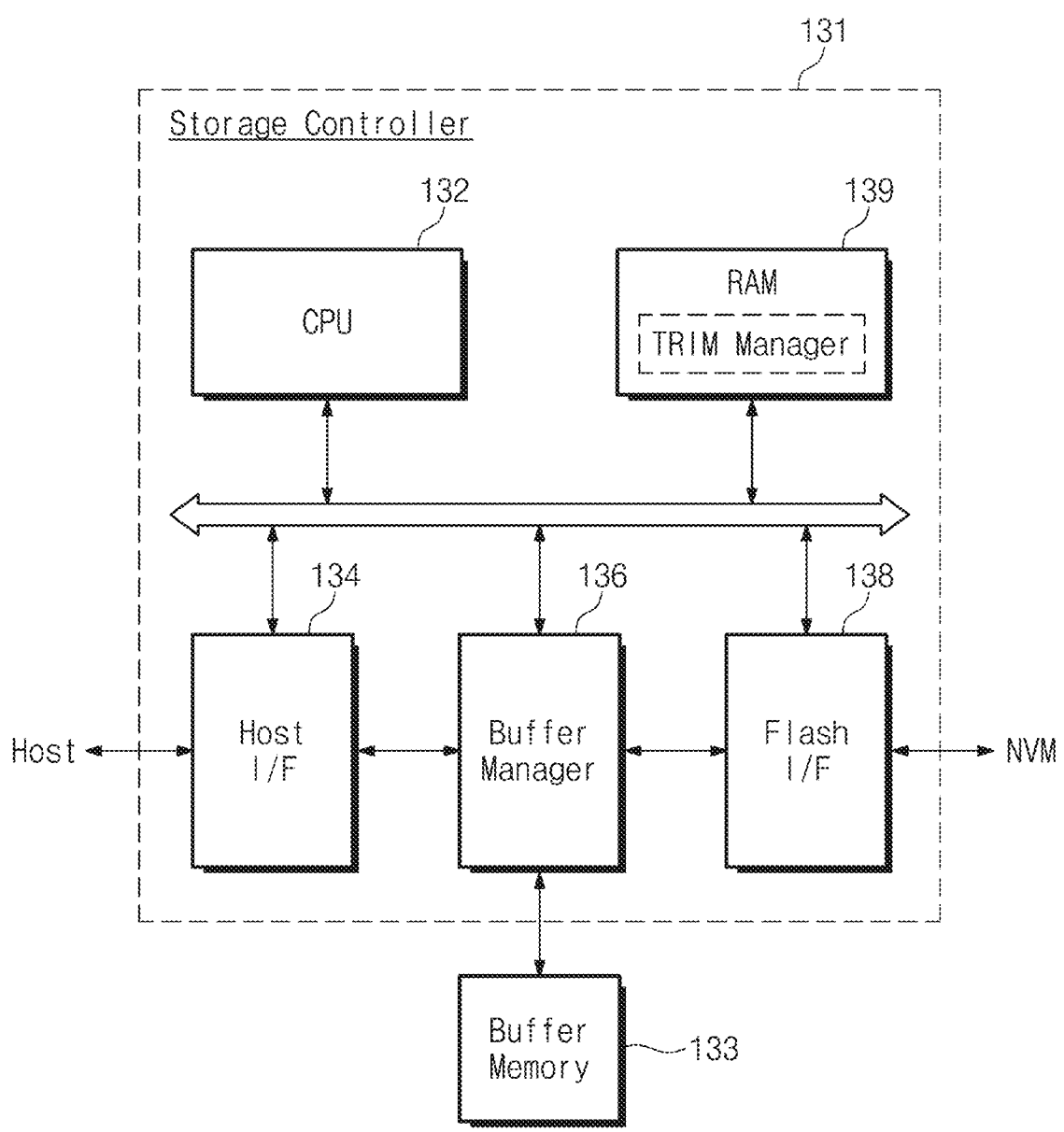
FIG. 3 is a block diagram illustrating the storage controller included in a storage device of FIG. 1.

FIG. 3 is a block diagram illustrating the storage controller included in a storage device of FIG. 1. Referring to FIG. 3, the storage controller 131 may write data to or perform a trim operation in the nonvolatile memory device 135, in response to a command of the host 110. The storage controller 131 may include a CPU 132, a random access memory (hereinafter referred to as "RAM") 139, a host interface 134, a buffer manager 136, and a flash interface 138.

The CPU 132 may control overall operations of the storage controller 131 and may execute a logical operation. The CPU 132 may communicate with the host 110 through the host interface 134 and may communicate with the nonvolatile memory device 135 through the flash interface 138. Further, the CPU 132 may manage the buffer memory 133 through the buffer manager 136. The CPU 132 may execute a trim manager that is loaded to the RAM 139. The CPU 132 may execute a trim command TRIM CMD, which is provided from the host 110, under control of the trim manager. The trim manager may be implemented with a part of, for example, a flash translation layer (FTL). The CPU 132 may be provided as a multi-core processor implemented with a plurality of cores.

The RAM 139 may be used as a working memory, a cache memory, or a buffer memory of the CPU 132. The RAM 139 may store codes and commands that the CPU 132 executes. The RAM 139 may store data to be processed by the CPU 132. The RAM 139 may be implemented with a static RAM (SRAM). The trim manager may be loaded onto the RAM 139. Further, the FTL or a variety of memory management modules may be stored in the RAM 139. The FTL may perform a function of, for example, address mapping, garbage collection, and/or wear leveling for interfacing between the nonvolatile memory device 135 and the host 110.

The host interface 134 may be configured to communicate with the host 110 under control of the CPU 320. The host interface 134 may convey communications using at least one of various communication manners (e.g., a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), and a load reduced DIMM (LRDIMM)).

The buffer manager 136 may be configured to control the buffer memory 133 (refer to FIG. 1) under control of the CPU 320. The buffer manager 136 may control the buffer memory 133 so as to temporarily store data exchanged between the nonvolatile memory device 135 (refer to FIG. 1) and the host 110.

The flash interface 138 may be configured to communicate with the nonvolatile memory device 135 under control of the CPU 132. The flash interface 138 may exchange a command, an address, and data with the nonvolatile memory device 135 through an input/output channel. The flash interface 138 may exchange a control signal with the nonvolatile memory device 135 through a control channel.

The storage controller 131 having the above-mentioned configuration may access the nonvolatile memory device 135 and the buffer memory 133. The storage controller 131 may perform write, read, and erase in response to a request from outside. The storage controller 131 may write write-requested data to the nonvolatile memory device 135 and may read the read-requested data from the nonvolatile memory device 135. The storage controller 131 may erase a specified memory area of the nonvolatile memory device 135 in response to the trim command TRIM CMD from the host 110.

The storage controller 131 may manage the storage device 130 by using the buffer memory 133. For example, the storage controller 131 may temporarily store data to be written to the nonvolatile memory device 135 or data read from the nonvolatile memory device 135 in the buffer memory 133. The storage controller 131 may load metadata, based on which the nonvolatile memory device 135 is managed, on the buffer memory 133.

According to the above example embodiment of the inventive concepts, a configuration and a function of the storage controller 131 performing the trim command TRIM CMD in the storage device 130 is briefly described. The storage device 130 may be implemented by, for example, an SSD, a memory card, or an embedded memory card. However, example embodiments are not limited thereto.

Figure 4:
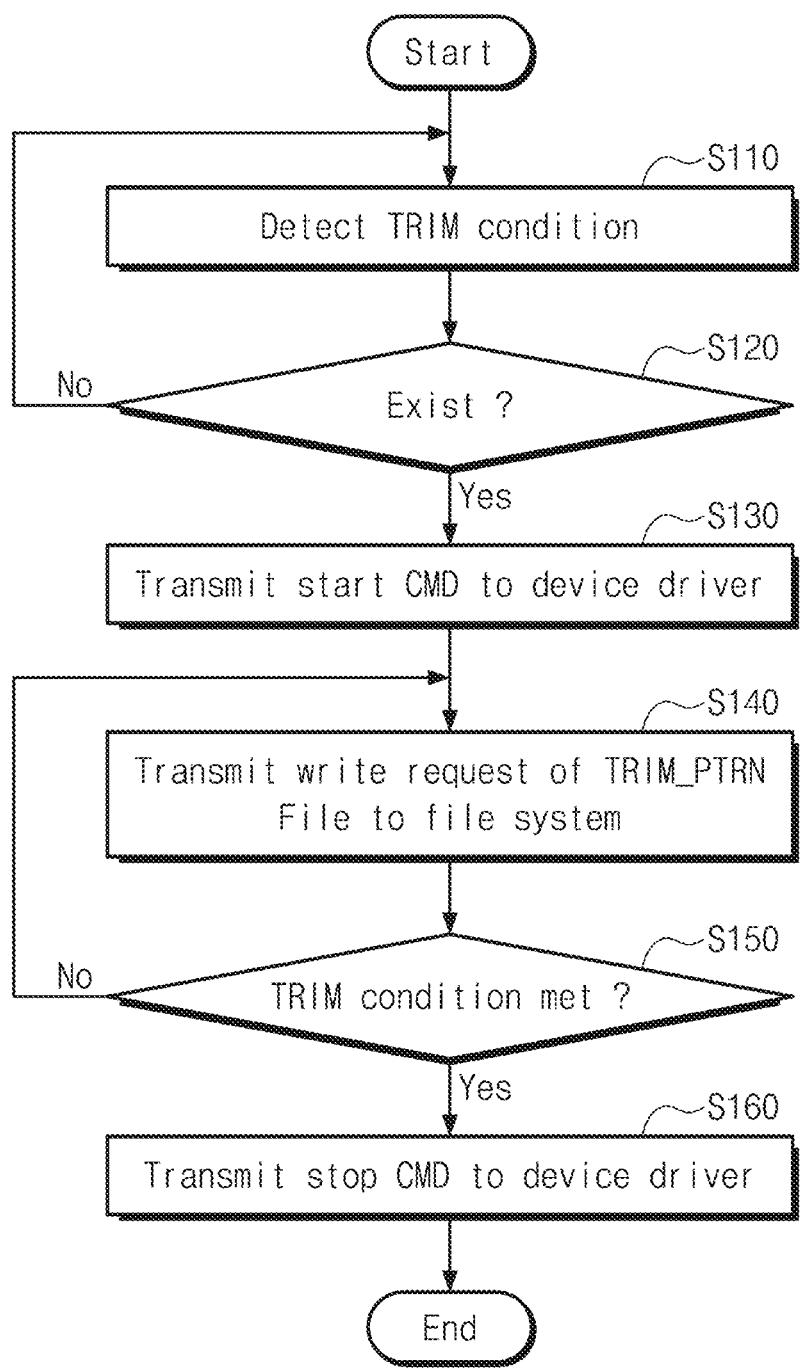
FIG. 4 is a flowchart illustrating an operation of an application program for a trim, according to an example embodiment of the inventive concepts.

FIG. 4 is a flowchart illustrating an operation of an application program for a trim, according to an example embodiment of the inventive concepts. Referring to FIGS. 2 and 4, a trim command TRIM CMD to be provided to the storage device 130 may be generated by the application program 112 and the device driver 116 of the host 110.

In operation S110, the application program 112 may determine whether the execution of the trim operation on the storage device 130 is desired. The application program 112 may determine whether the execution of trim operation is desired or not by monitoring one or more parameters (e.g., performance of the storage device 130, lack of free storage space, or the number of free blocks).

In operation S120, the process branches according to an existence of an execution request of the trim operation. If the execution request of the trim operation exists (Yes), the process proceeds to operation S130. On the other hand, if the execution request of the trim operation does not exist (No), the process returns to operation S110. In this case, the application program 112 may detect a request of the trim operation.

In operation S130, the application program 112 may transmit a start command Start CMD to the device driver 116. In this case, the device driver 116 may activate or turn on the pattern checker 118 in response to the start command Start CMD.

In operation S140, the application program 112 may transmit a write request for a file of a specified pattern to the file system 114. Hereinafter, a data pattern of the write-requested file for a trim may be referred to as "trim pattern TRIM_PTRN". The application program 112 may provide the file of the trim pattern TRIM_PTRN to the file system 114 and may request the file system 114 to write the file of the trim pattern TRIM_PTRN. In this case, the file system 114 may generate a start address, a data size, and the like for writing the file of the trim pattern TRIM_PTRN by using address information about an unused area of the storage device 130. The file system 114 may provide the device driver 116 with the start address, the data size, and the like. The device driver 116 may check whether a pattern of the write-requested data is the trim pattern TRIM_PTRN, by using the pattern checker 118. If the pattern of the write-requested data is the same as the trim pattern TRIM_PTRN, the device driver 116 may provide the storage device 130 with the trim command TRIM CMD associated with the write-requested address area. On the other hand, if the pattern of the write-requested data is different from the trim pattern TRIM_PTRN, the device driver 116 may provide the storage device 130 with a write command Write CMD of the write-requested data.

In operation S150, the application program 112 may stop or continue the trim operation based on whether the trim operation is sufficiently executed. If the application program 112 determines that the trim operation is not desired to be executed any more, the process proceeds to operation S160. If the application program 112 determines that further execution of the trim operation is desired, the process returns to operation S140. In this case, in operation S140, the application program 112 may provide the file of the trim pattern TRIM_PTRN to the file system 114, and the device driver 116 requested by the file system 114 to write the trim pattern TRIM_PTRN may transmit the trim command TRIM CMD to the storage device 130.

In operation S160, the application program 112 may transmit a stop command Stop CMD to the device driver 116. In this case, the device driver 116 may be deactivated or turned off a function of the pattern checker 118 and may stop a pattern comparison operation executed for the trim. The write-requested data may be written in the storage device 130 regardless of the pattern.

Above, the operations of the application program 112, the file system 114, and the device driver 116 in the host 110 for generating the trim command are briefly described. For example, the application program 112 may activate/deactivate the trim function of the device driver 116 by using the start command Start CMD and the stop command Stop CMD. While the trim function is activated, the application program 112 may only provide the file system 114 with data of the specified pattern. Because the application program 112 does not receive separate address information for the trim from the file system 114, the trim function that is less dependent on the file system 114 may be provided.

Figure 5:
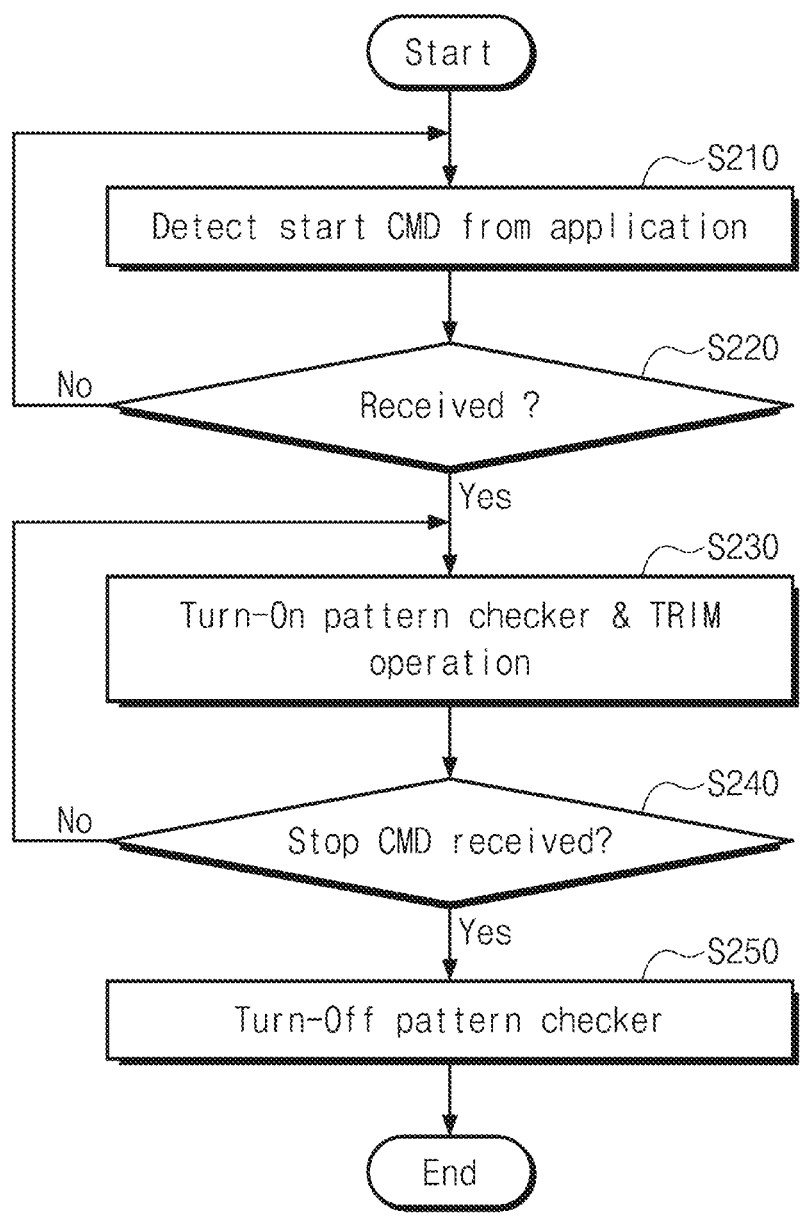
FIG. 5 is a flowchart illustrating an operation of a device driver, according to an example embodiment of the inventive concepts.

FIG. 5 is a flowchart illustrating an operation of a device driver, according to an example embodiment of the inventive concepts. Referring to FIG. 5, the device driver 116 may provide a write command Write CMD or a trim command TRIM CMD to the storage device 130 in response to a command or data provided from the application program 112 and the file system 114.

In operation S210, the device driver 116 may detect whether a start command Start CMD provided from the application program 112 is received. The start command Start CMD is a command indicating activation of a trim operation.

In operation S220, the device driver 116 may branch according to whether the start command Start CMD is received. If the start command Start CMD is not received (No), the process may return to operation S210. If the start command Start CMD is received (Yes), the process may proceed to operation S230.

In operation S230, the device driver 116 may turn on the pattern checker 118. The pattern checker 118 may detect whether write data provided from the file system 114 is the same as a trim pattern TRIM_PTRN. The device driver 116 may generate the trim command TRIM CMD or the write command Write CMD associated with a storage area, in which the write-requested data is stored, based on whether the write data is the same as the trim pattern TRIM_PTRN. In some example embodiments, the transmission time point of the trim command TRIM CMD or the write command Write CMD may be after the pattern checker 118 is turned off.

In operation S240, the device driver 116 may branch according to whether the stop command Stop CMD is received. If the stop command Stop CMD is not received (No), the process may return to operation S230. If the stop command Stop CMD is received (Yes), the process may proceed to operation S250.

In operation S250, the device driver 116 may deactivate or turn off the pattern checker 118. In this case, the pattern comparison operation by the pattern checker 118 is stopped. Afterwards, write data provided from the file system 114 may be written in the storage device 130 regardless of a pattern.

Above, the method for generating the trim command TRIM CMD of the device driver 116 illustrated in FIG. 5 is described. While the pattern checker 118 is turned on, a storage area in which the write data provided as the specified pattern will be stored may be a target of the trim operation. When the pattern checker 118 is turned off, the write data may be programmed in the specified storage area.

Figure 6:
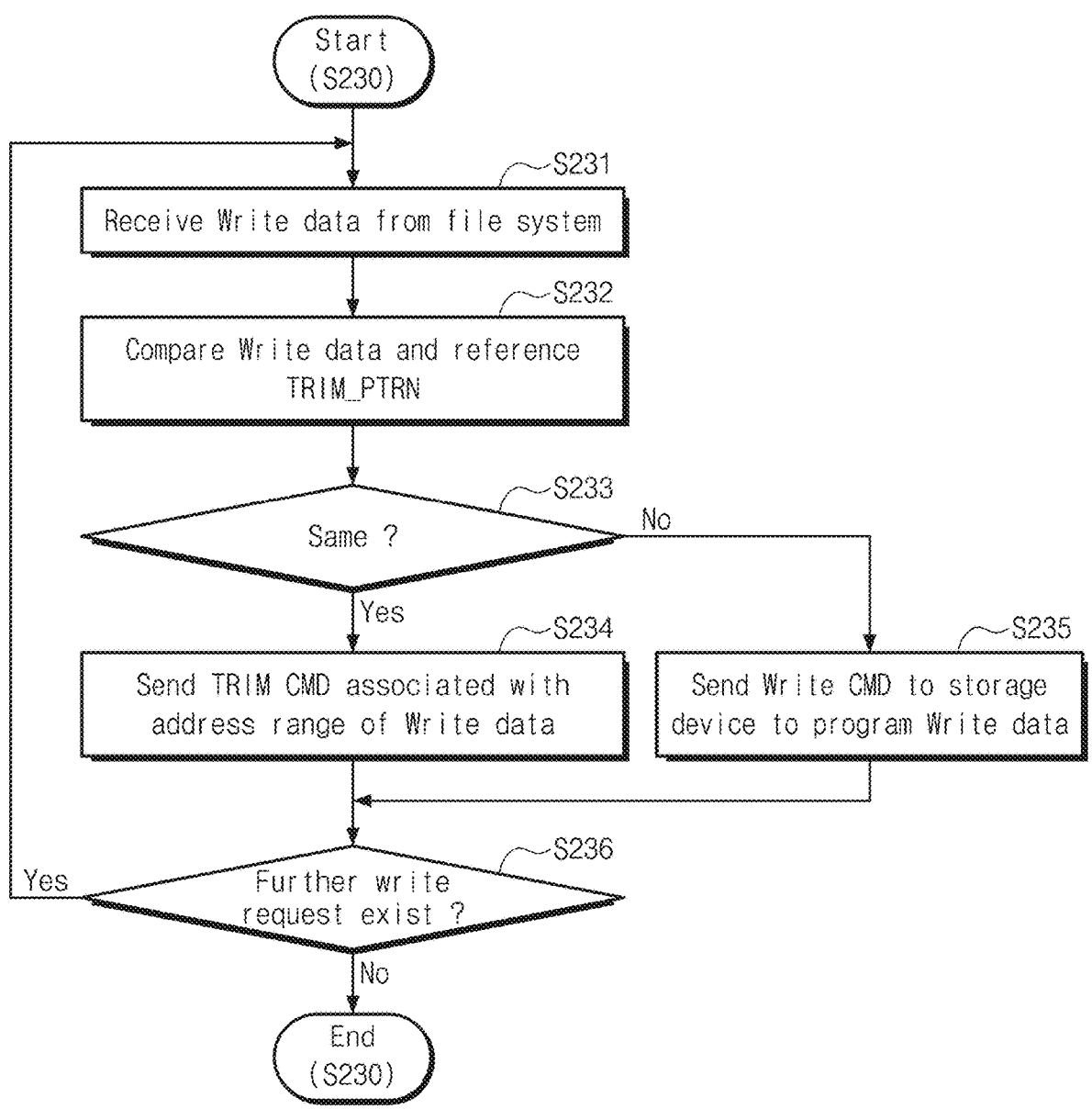
FIG. 6 is a flowchart illustrating a detailed operation of operation S230 of FIG. 5.

FIG. 6 is a flowchart illustrating a detailed operation of operation S230 of FIG. 5. Referring to FIG. 6, the device driver 116 may transmit a write command Write CMD or a trim command TRIM CMD to the storage device 130 based on a pattern of the write-requested data. Operation S230 indicates an operation in a state where the pattern checker 118 is turned on.

In operation S231, the device driver 116 may receive write data Write data provided from the file system 114. The write data provided to the device driver 116 may be data which divides or combines the write file provided to the file system 114 by the application program 112 according to a format of the file system 114. In some example embodiments, a data pattern of the write data provided from the file system 114 may be maintained as provided from the application program 112.

In operation S232, the device driver 116 may compare the write data Write data provided from the file system 114 with a trim pattern TRIM_PTRN stored in the device driver 116. The trim pattern TRIM_PTRN may be a data pattern, which may be defined in advance or chosen according to a rule, for a trim. The application program 112 may provide the file system 114 with a write-request of a file having a trim pattern TRIM_PTRN to provide the trim command. Further, the file system 114 may convert a file having the trim pattern TRIM_PTRN to data of a management unit (e.g., a sector unit) of the storage device 130 and may request the device driver 116 to write the data of a management unit.

In operation S233, the process may branch according to the comparison result of the write data Write data and the trim pattern TRIM_PTRN. If the write data Write data is the same as the trim pattern TRIM_PTRN (Yes), the process may proceed to operation S234. If it is detected that the write data Write data is different from the trim pattern TRIM_PTRN (No), the process may proceed to operation S235.

In operation S234, the device driver 116 may send the trim command TRIM CMD to the storage device 130 together with an address (e.g., LBA) corresponding to the write data Write data.

In operation S235, the device driver 116 may send the write command Write CMD to the storage device 130 so as to program the write data Write data in a storage area of the specified address (e.g., LBA).

In operation S236, the device driver 116 may detect whether there exists the write data Write data that the file system 114 requests the device driver 116 to write further. If the write data Write data is not further provided from the file system 114 (No), overall processes of operation S230 may end. If the following write data Write data is provided from the file system 114 (Yes), the process may return to operation S231.

The detailed operations of above-described operation S230 is only an example for helping understand example embodiments of the inventive concepts. Accordingly, a point in time when the trim command TRIM CMD is issued may not be limited to the details described above, and it is understood that the point in time is variously adjusted.

Figure 7:
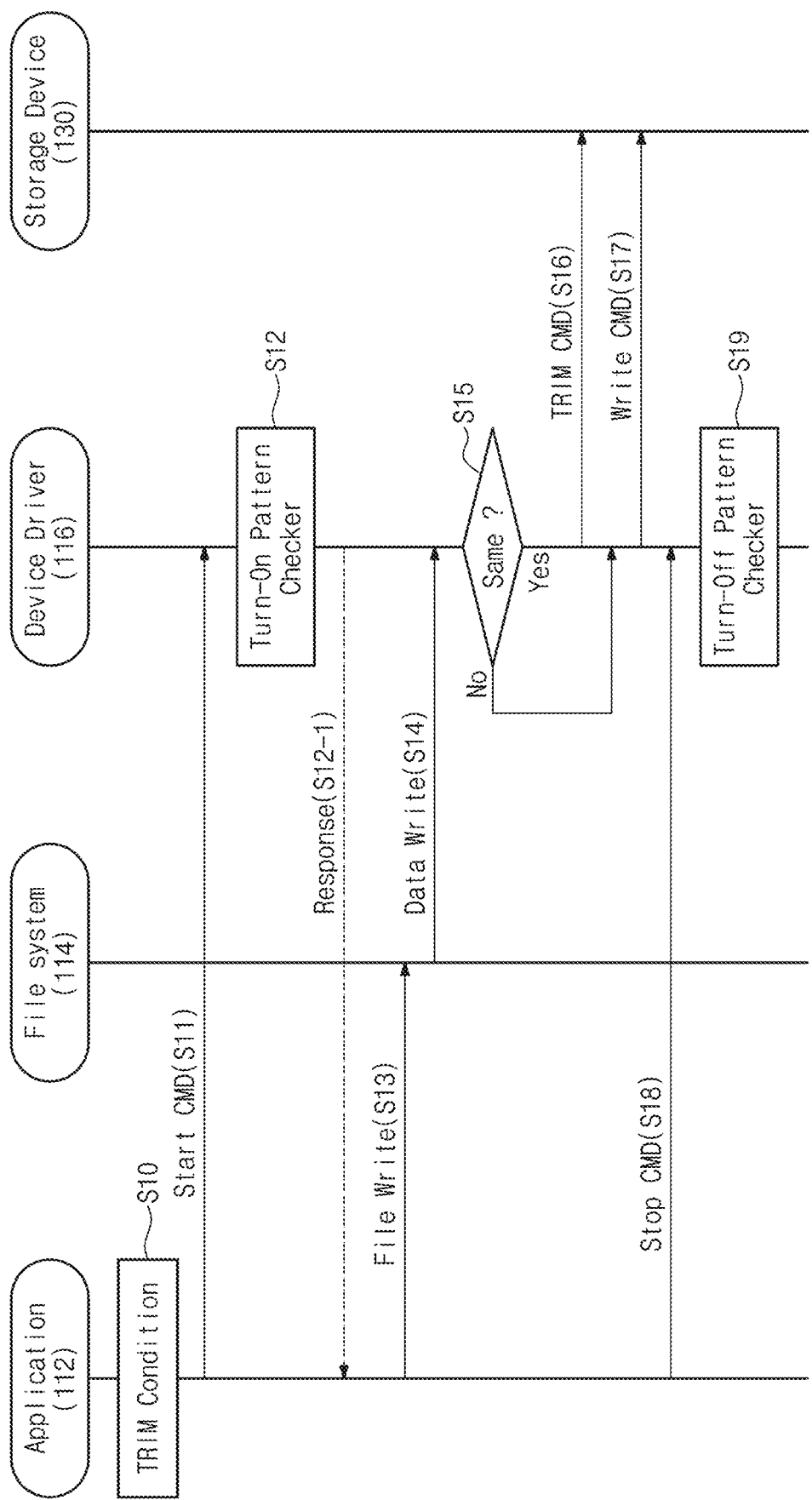
FIG. 7 is a drawing illustrating interactions between the application program, the file system, and the device driver of the host described in FIGS. 4 to 6.

FIG. 7 is a drawing illustrating interactions between the application program 112, the file system 114, and the device driver 116 of the host 110 described in FIGS. 4 to 6. Referring to FIG. 7, a trim operation may be performed without depending on support of the file system 114.

In operation S10, the application program 112 may detect occurrence of a trim condition TRIM Condition.

In operation S11, the application program 112 may transmit a start command Start CMD, which indicates a start of a trim operation, to the device driver 116.

In operation S12, the device driver 116 may turn on the pattern checker 118 based on the start command Start CMD.

In operation S12-1, the device driver 116 may transmit information indicating that the pattern checker 118 is in a turn-on state to the application program 112 in response to the start command Start CMD. Operation S12-1 indicating a response process may be omitted if necessary.

In operation S13, the application program 112 may transmit a write-request for a file having a specified pattern to the file system 114.

In operation S14, the file system 114 may allocate the write-requested file to an unused area of the storage device 130 in response to a file write request from the application program 112. Further, the file system 114 may requests the device driver 116 to write data based on data unit (e.g., a sector unit) corresponding to the allocated area.

In operation S15, the device driver 116 may compare whether a pattern of the write-requested data from the file system 114 is the same as a trim pattern TRIM_PTRN.

If the pattern of the write-requested data is the same as the trim pattern TRIM_PTRN, in operation S16, the device driver 116 may transmit a trim command TRIM CMD to the storage device 130.

However, if the pattern of the write-requested data is different from the trim pattern TRIM_PTRN, in operation S17, the device driver 116 may transmit a write command Write CMD to the storage device 130.

The storage device 130 may perform a trim operation accompanied by an erase operation on the indicated address range in response to the trim command TRIM CMD. When receiving the write command Write CMD, the storage device 130 may program the write data in a storage area of a corresponding address range.

In operation S18, the application program 112 may transmit the stop command Stop CMD to the device driver 116.

In operation S19, the device driver 116 may turn off the pattern checker 118 and may end the trim operation.

If the stop command Stop CMD is not transmitted, the application program 112, the file system 114, and the device driver 116 may repeat operation S13 to operation S17.

Above, example interactions between the application program 112, the file system 114, and the device driver 116 for the trim operation is described. In some example embodiments, the transmission of the trim command TRIM CMD or the write command Write CMD may be performed after the transmission of the stop command Stop CMD. Such example embodiment will be described with reference to drawings.

Figure 8:
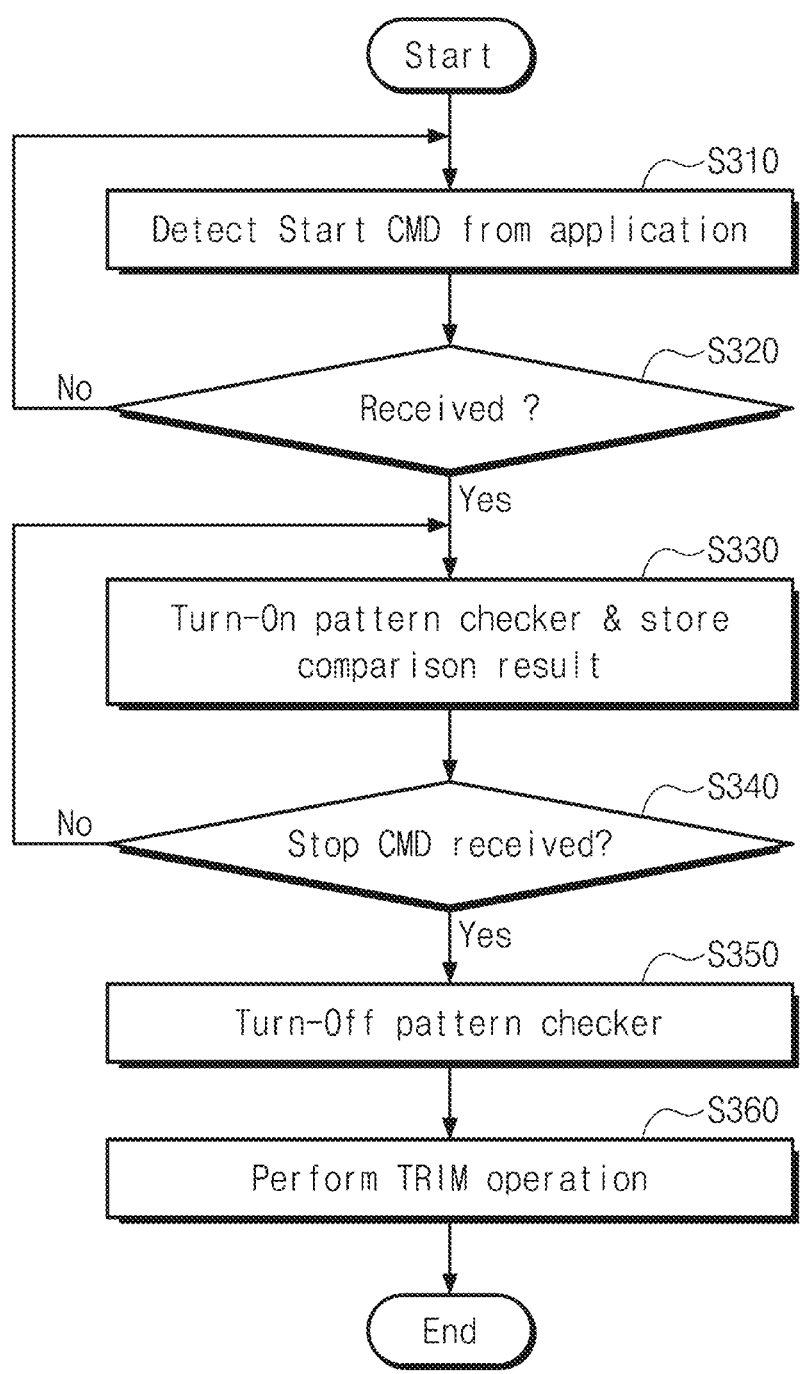
FIG. 8 is a flowchart illustrating an operation of a device driver, according to another example embodiment of the inventive concepts.

FIG. 8 is a flowchart illustrating an operation of a device driver, according to another example embodiment of the inventive concepts. Referring to FIG. 8, the device driver 116 may provide a trim command TRIM CMD to the storage device 130 in response to a command or data provided from the application program 112 and the file system 114. In this case, the trim command TRIM CMD may be transmitted to the storage device 130 with reference to accumulated results of checks on the pattern checker 118 after the pattern checker 118 is turned off. Here, operation S310 and operation S320 are the same as or substantially similar to operation S210 to operation S220 of FIG. 5. Thus, a description thereof is omitted.

A start command Start CMD may be transmitted to the device driver 116 as a detection resulting in operation S310 and operation S320.

In operation S330, the device driver 116 may turn on the pattern checker 118 based on the start command Start CMD. Further, the pattern checker 118 may compare whether write data Write data provided from the file system 114 is the same as a trim pattern TRIM_PTRN. In some example embodiments, results of the comparison may be stored in a specified memory, and the trim command TRIM CMD or the write command Write CMD may not be generated.

In operation S340, the device driver 116 may branch according to whether the stop command Stop CMD is received. If the stop command Stop CMD is not received (No), the process may return to operation S330. If the stop command Stop CMD is received (Yes), the process may proceed to operation S350.

In operation S350, the device driver 116 may deactivate or turn off the pattern checker 118. In this case, the pattern checker 118 may stop the pattern comparison operation. Then, write data provided from the file system 114 may be written in the storage device 130 regardless of a pattern.

In operation S360, the device driver 116 may generate the trim command TRIM CMD or the write command Write CMD by using the accumulated results of the comparison in operation S330. That is, by using the trim command TRIM CMD, the device driver 116 may process an area in which pieces of data, which has the same pattern as the trim pattern TRIM_PTRN, from among the write-requested pieces of data are stored. On the other hand, by using the write command Write CMD, the device driver 116 may process pieces of data, which has a pattern is different from the trim pattern TRIM_PTRN, from among the write-requested pieces of data.

Above, another method for generating the trim command TRIM CMD of the device driver 116 is described in FIG. 8. An operating method of FIG. 5 and an operating method of FIG. 8 may be selected or combined according to environments (e.g., hardware of the host 110, an operating system of the host 110, or a characteristic of the storage device 130).

Figure 9:
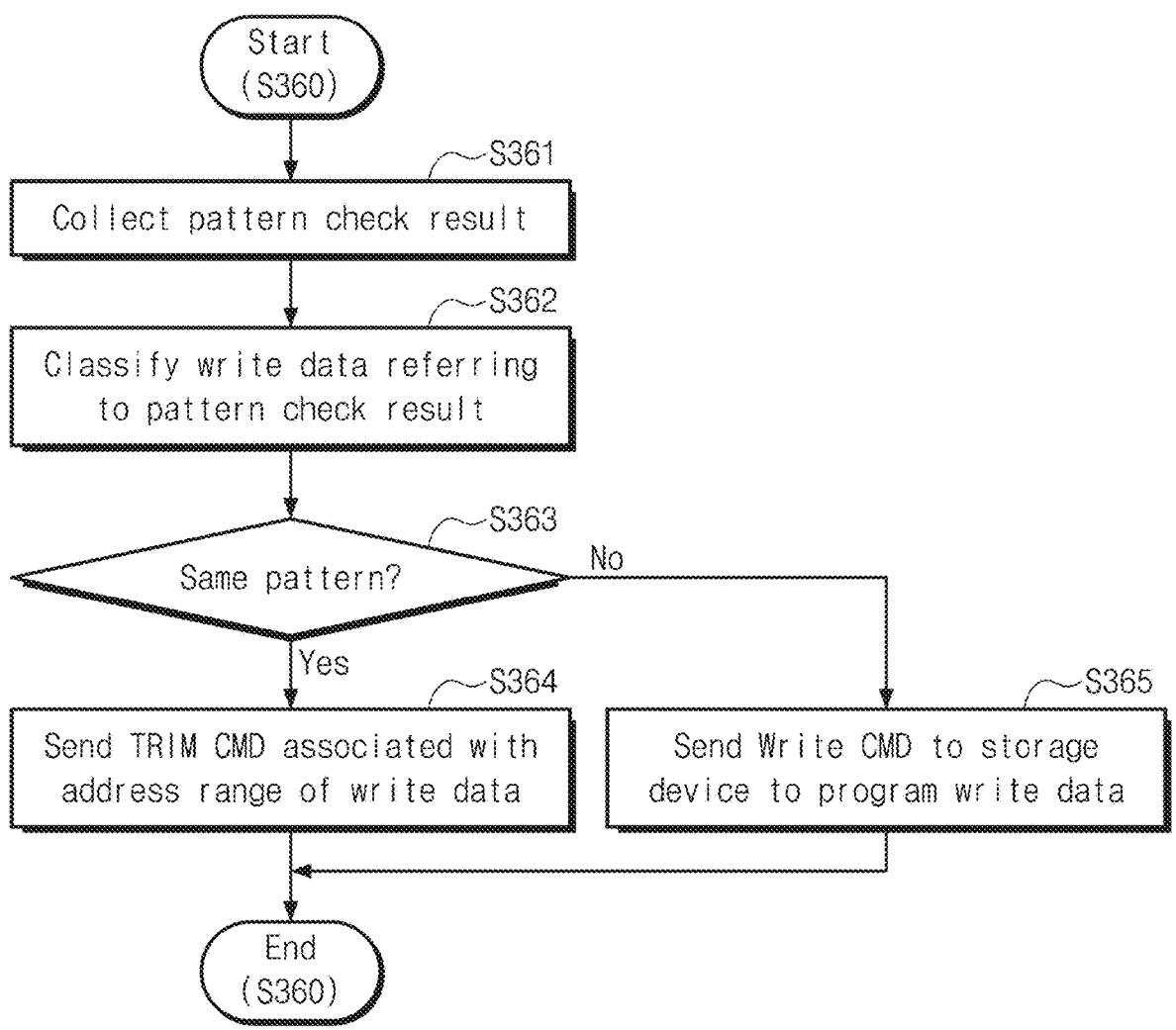
FIG. 9 is a flowchart illustrating a detailed operation of operation S360 of FIG. 8.

FIG. 9 is a flowchart illustrating a detailed operation of operation S360 of FIG. 8. Referring to FIG. 9, the device driver 116 may accumulate results of a pattern check with regard to the write data provided from the file system 114, and may transmit a trim command TRIM CMD to the storage device 130 based on the accumulated results of the pattern check.

In operation S361, the device driver 116 may collect results of a pattern check that is performed in operation S330 (refer to FIG. 8) by the pattern checker 118. That is, the device driver 116 may read whether a pattern of the write-requested pieces of data is the same as a trim pattern TRIM_PTRN, from the stored memory area.

In operation S362, the device driver 116 may classify pieces of write data provided from the file system 114 into one that is the same as the trim pattern TRIM_PTRN and one that is different from the trim pattern TRIM_PTRN.

In operation S363, the device driver 116 may branch according to the classification result. If the write data is the same as the trim pattern TRIM_PTRN (Yes), the process may proceed to operation S364. On the other hand, if the write data is different from the trim pattern TRIM_PTRN (No), the process may proceed to operation S365.

In operation S364, the device driver 116 may generate the trim command TRIM CMD for trimming a storage area in which the write-requested pieces of data are stored, and transmits the trim command TRIM CMD to the storage device 130.

In operation S365, the device driver 116 may transmit a write command for programming the write-requested pieces of data in a storage area to the storage device 130.

Above, the detailed operation of operation S360 is only one example for helping understand example embodiments of the inventive concepts. Accordingly, a point in time when the trim command TRIM CMD is issued is not limited to the described details. The point in time may be variously adjusted.

Figure 10:
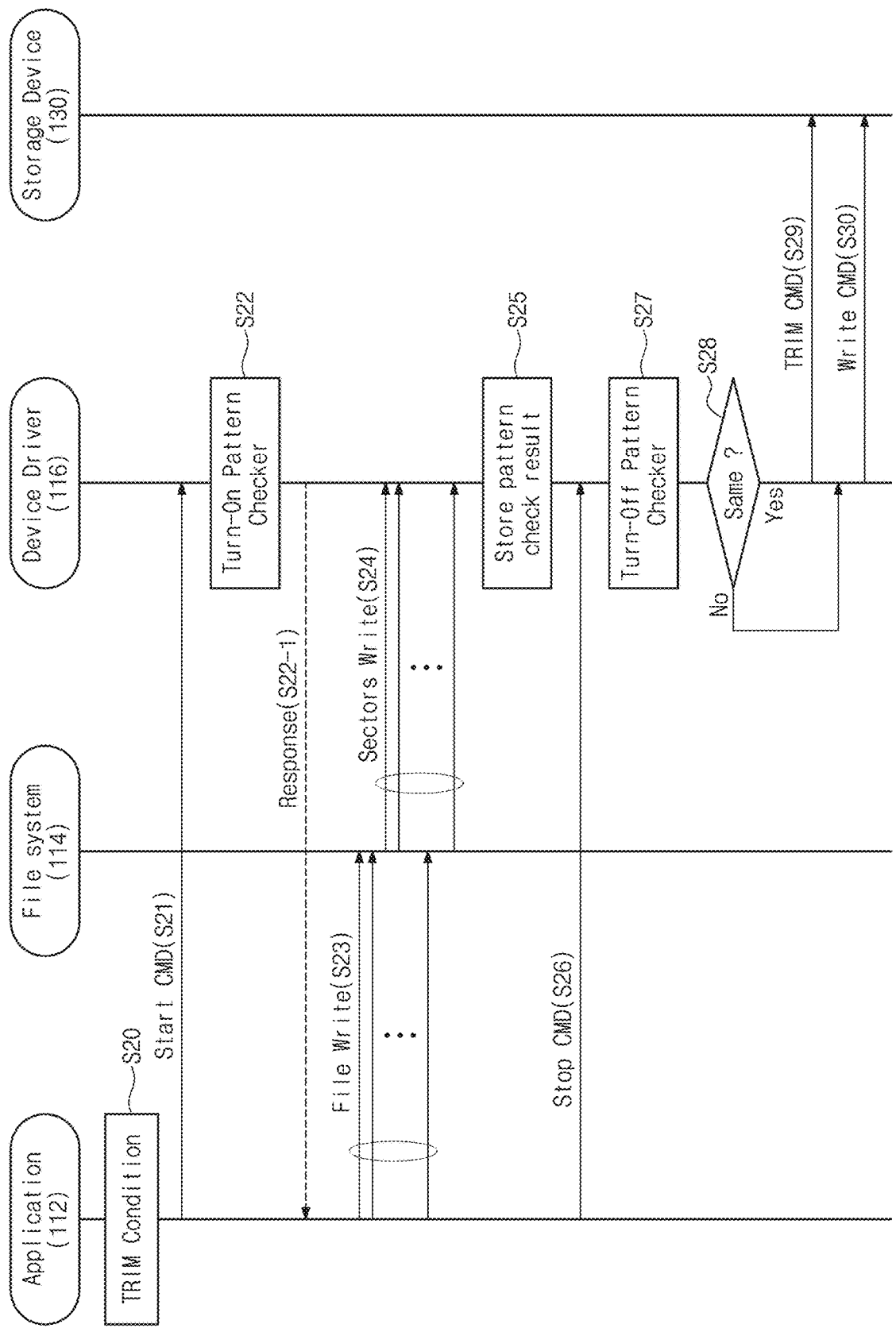
FIG. 10 is a drawing illustrating interactions among the application program, the file system, and the device driver of the host described in FIGS. 8 and 9.

FIG. 10 is a drawing illustrating interactions among the application program 112, the file system 114, and the device driver 116 of the host 110 described in FIGS. 8 and 9. Referring to FIG. 10, the device driver 116 may accumulate and combine results of a pattern check and may generate a trim command TRIM CMD.

In operation S20, the application program 112 may detect an event in which a trim condition TRIM Condition is desired. For example, there may be a case in which available memory capacity at which data can be written in the storage device 130 reaches a threshold value or the number of free blocks is less than a reference value.

In operation S21, the application program 112 may transmit a start command Start CMD, which indicates a start of a trim operation, to the device driver 116.

In operation S22, the device driver 116 may turn on the pattern checker 118 based on the start command Start CMD.

In operation S22-1, the device driver 116 may transmit information indicating that the pattern checker 118 is in a turn-on state to the application program 112 in response to the start command Start CMD. Operation S22-1 indicating a response process of the device driver 116 may be omitted if desired.

In operation S23, the application program 112 may transmit a write-request for a file having a specified pattern to the file system 114. In this case, the application program 112 may transmit a write-request of a plurality of files to the file system 114.

In operation S24, the file system 114 may convert the files, which are write-requested from the application program 112, to data of a management unit of the file system 114. Further, the file system 114 may allocate data of the management unit to an unused area of the storage device 130. The file system 114 may request the device driver 116 to write a data unit (e.g., a sector unit) corresponding to the allocated area.

In operation S25, the device driver 116 may compare whether a pattern of the write-requested data from the file system 114 is the same as a trim pattern TRIM_PTRN. The comparison result with the trim pattern TRIM_PTRN associated with each of pieces of data may be stored in a memory and may be accumulated.

In operation S26, the application program 112 may transmit the stop command Stop CMD to the device driver 116.

In operation S27, the device driver 116 may turn off the pattern checker 118.

In operation S28, the device driver 116 may transmit the trim command TRIM CMD or the write command Write CMD to the storage device 130 with reference to the comparison results accumulated in operation S25.

In operation S29, the device driver 116 may assign the trim command TRIM CMD to write data of a pattern that is the same as the trim pattern TRIM_PTRN. Next, a trim command for trimming a storage area corresponding to the write data in which the trim command TRIM CMD is assigned may be transmitted. Furthermore, the device driver 116 may assign a write command Write CMD to the write data of a pattern that is different from the trim pattern TRIM_PTRN, and may transmit a write command to the storage device 130. The storage device 130 may perform a trim operation with an erase operation on the indicated address range in response to the trim command TRIM CMD. When receiving the write command Write CMD, the storage device 130 may program the write data in a storage area of a corresponding address range.

Above, interactions of the application program 112, the file system 114, and the device driver 116 for the trim operation are described. The transmission time point of the trim command TRIM CMD or the write command Write CMD is not limited to this disclosure.

Figure 11:
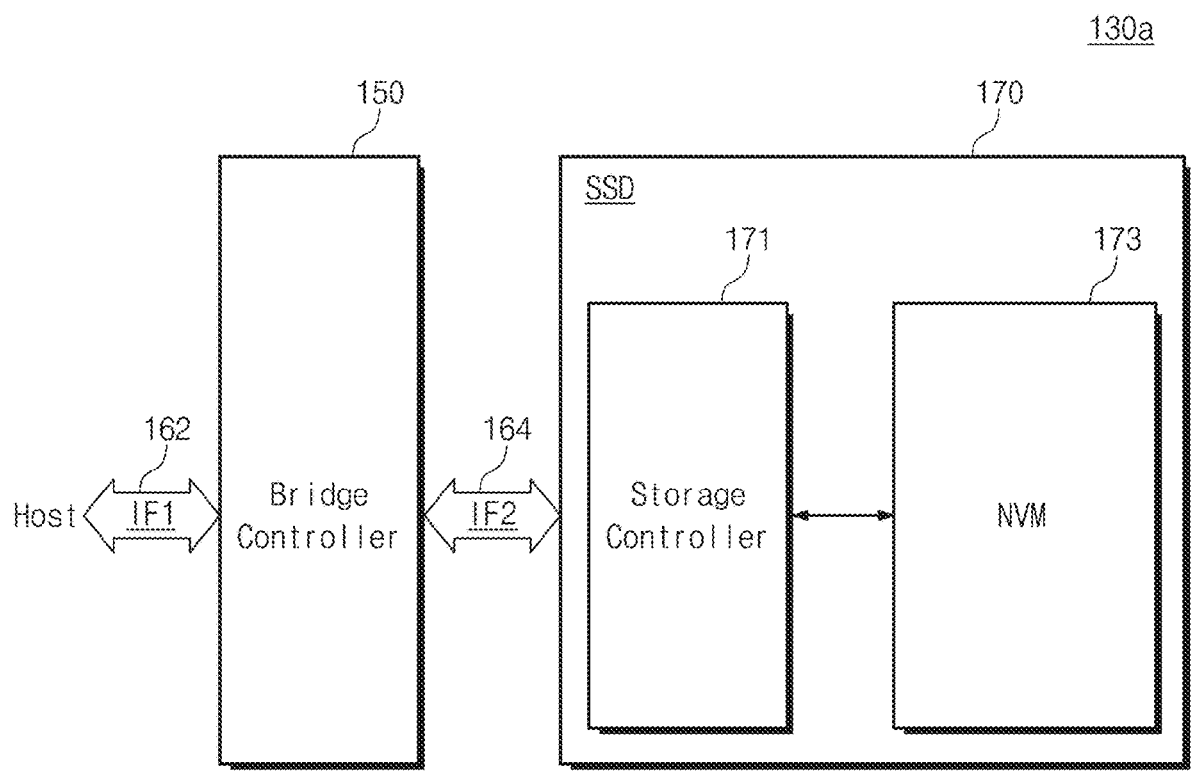
FIG. 11 is a block diagram illustrating another example of the storage device of FIG. 1.

FIG. 11 is a block diagram illustrating another example of the storage device of FIG. 1. Referring to FIG. 11, a storage device 130a may be an SSD connected with a host 110 through a first interface IF1. For example, the storage device 130a may be implemented with a portable SSD that is capable of being connected with the host 110 through a USB port. In some example embodiments, the storage device 130a may be implemented with a portable SSD that is capable of being connected with the host 110 through a Thunderbolt port. The storage device 130a may include a bridge controller 150 and an SSD 170.

The bridge controller 150 may connect a second interface IF2 164 of the SSD 170 to the first interface IF1 162 of the host 110. For example, when the bridge controller 150 is used, the SSD 170 using an interface of a SATA manner may be connected with the host 110 through a connection port of a USB manner. For example, by the bridge controller 150, the SSD 170 using an interface of an NVMe manner may be connected with the host 110 through a Thunderbolt connection port. In this case, the combination of the first interface IF1 162 and second interface IF2164 may not be limited to the example embodiments described above and may be combinations of various interfaces for various purposes.

The SSD 170 may include a storage controller 171 and a nonvolatile memory device 173. Although not illustrated in FIG. 11, the SSD 170 may further include a buffer memory. A configuration of the SSD 170 may be the same as or substantially similar to a configuration of the storage device 130 of FIG. 1. Thus, detailed description thereof is thus omitted.

When the storage device 130*a* is connected with the host 110 through a port supporting the first interface IF1, the specified file system may not support the trim operation on the storage device 130*a* connected with the USB port. However, according to an example embodiment of the inventive concepts, when the trim scheme is applied thereto, the trim command TRIM CMD may be provided by the application program 112 and the device driver 116. Accordingly, according to an example embodiment of the inventive concepts, when the trim scheme is applied thereto, the trim operation on various storage devices may be supported regardless of a characteristic or a type of the file system 114.

Figure 12:
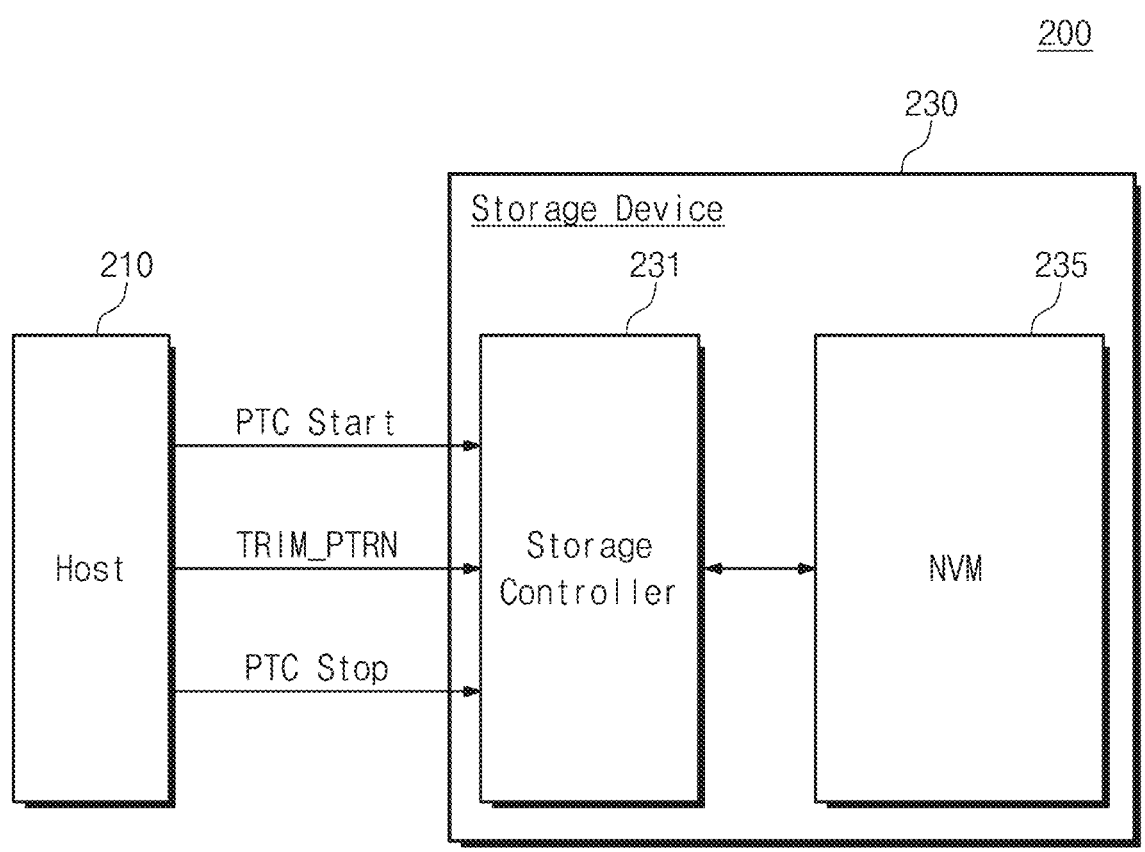
FIG. 12 is a block diagram illustrating a user device, according to another example embodiment of the inventive concepts.

FIG. 12 is a block diagram illustrating a user device, according to another example embodiment of the inventive concepts. Referring to FIG. 12, a user device 200 may include a host 210 and a storage device 230.

The host 210 may transmit a pattern check start command PTC Start, a trim pattern TRIM_PTRN, and a pattern check stop command PTC Stop to the storage device 230. The storage device 230 may perform a trim operation in response to the pattern check start command PTC Start, the trim pattern TRIM_PTRN, and the pattern check stop command PTC Stop.

When a trim condition is detected or met, the host 210 may transmit the pattern check start command PTC Start to the storage device 230. In this case, a storage controller 231 may activate a function that compares a pattern of data provided from the host 210 with a specified pattern (e.g., TRIM_PTRN). Next, the host 210 may transmit write data of the trim pattern TRIM_PTRN to the storage device 230. When the write data of the specified pattern is checked, the storage controller 231 may perform the trim operation on a memory area of the write-requested nonvolatile memory device 235. The trim operation may be ended by the pattern check stop command PTC Stop from the host 210.

The storage device 230 may perform the trim operation by using the write data provided from the host 210, the pattern check start command PTC Start, and the pattern check stop command PTC Stop, without a separate trim command TRIM CMD.

Figure 13:
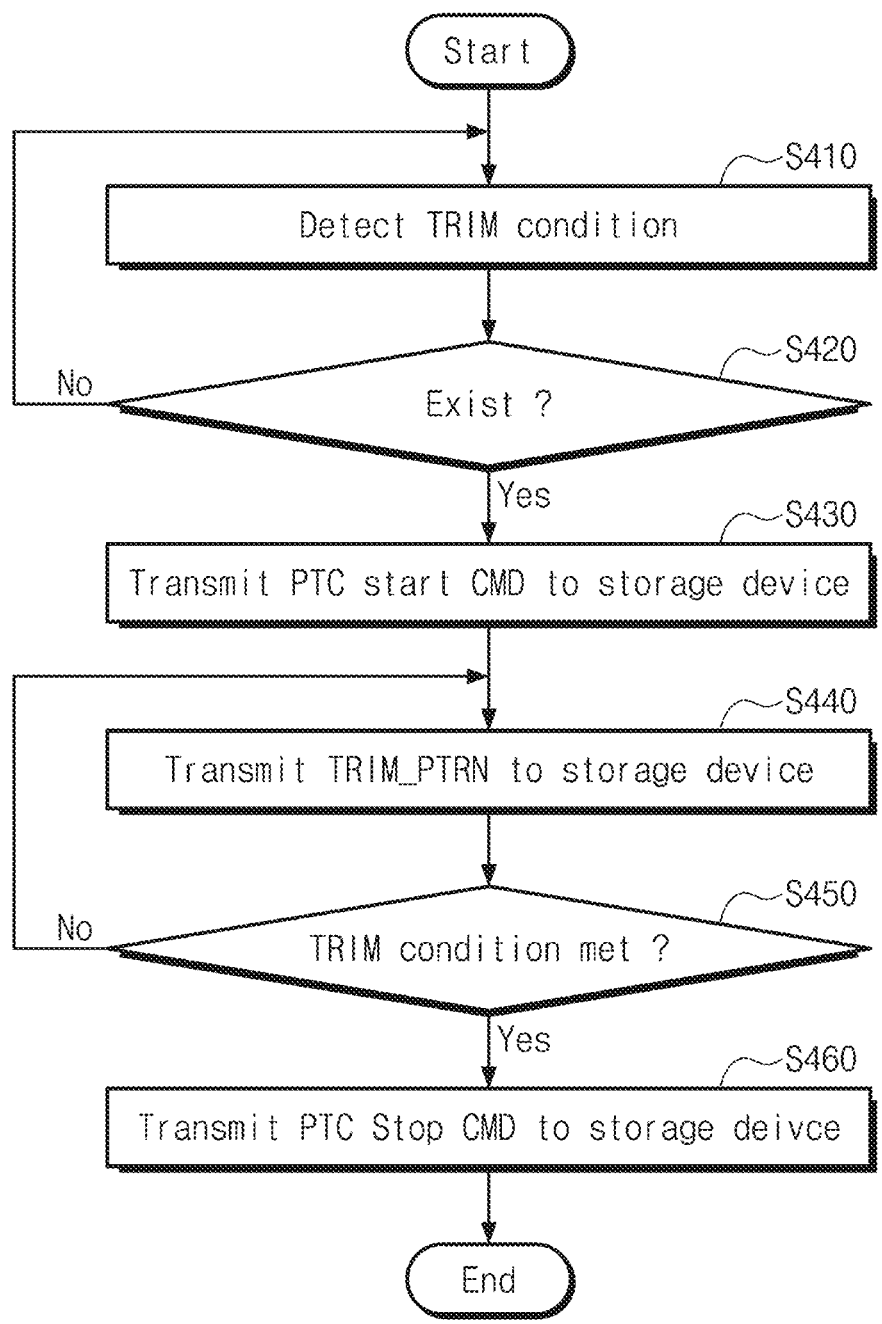
FIG. 13 is a flowchart illustrating a trim operation performed by the host of FIG. 12.

FIG. 13 is a flowchart illustrating a trim operation performed by the host of FIG. 12. Referring to FIG. 13, the host 210 may control the trim operation of the storage device 230 by using a pattern check start command PTC Start CMD, a trim pattern TRIM_PTRN, and a pattern check stop command PTC Stop CMD without generating a separate trim command.

In operation S410, the host 210 may detect a trim condition (e.g., desirability of trimming the storage device 230). For example, the desirability may be detected based on whether the number of free blocks of the storage device 230 is less than or equal to a reference value or whether available memory capacity is less than or equal to a reference size. The desirability of trimming the trim operation may be differently determined.

In operation S420, the host 210 may branch according to whether a trim condition is met. When the trim condition is met, the process may proceed to operation S430. If the trim condition is not met, the process may return to operation S410.

In operation S430, the host 210 may transmit the pattern check start command PTC Start CMD for activating the trim operation of the storage device 230 to the storage device 230.

In operation S440, the host 210 may transmit data, which has the trim pattern TRIM_PTRN defined in advance or chosen according to a rule, to the storage device 230. The data having the trim pattern TRIM_PTRN may be transmitted to the storage device 230 by using a write command. However, a method for transmitting the data having the trim pattern TRIM_PTRN is not limited to this disclosure.

In operation S450, the host 210 may detect a stop condition by determining, for example, whether that the number of free blocks of the storage device 230 is greater than or equal to a reference value or available memory capacity is greater than or equal to a reference size. In some example embodiments, the stop condition for the trim operation may be detected differently. When a trim stop condition is met, the process may proceed to operation S460. When the trim stop condition is not met, the process may return to operation S440.

In operation S460, the host 210 may transmit the pattern check stop command PTC Stop CMD to the storage device 230. In this case, the trim operation of the storage device 230 may be deactivated.

Figure 14:
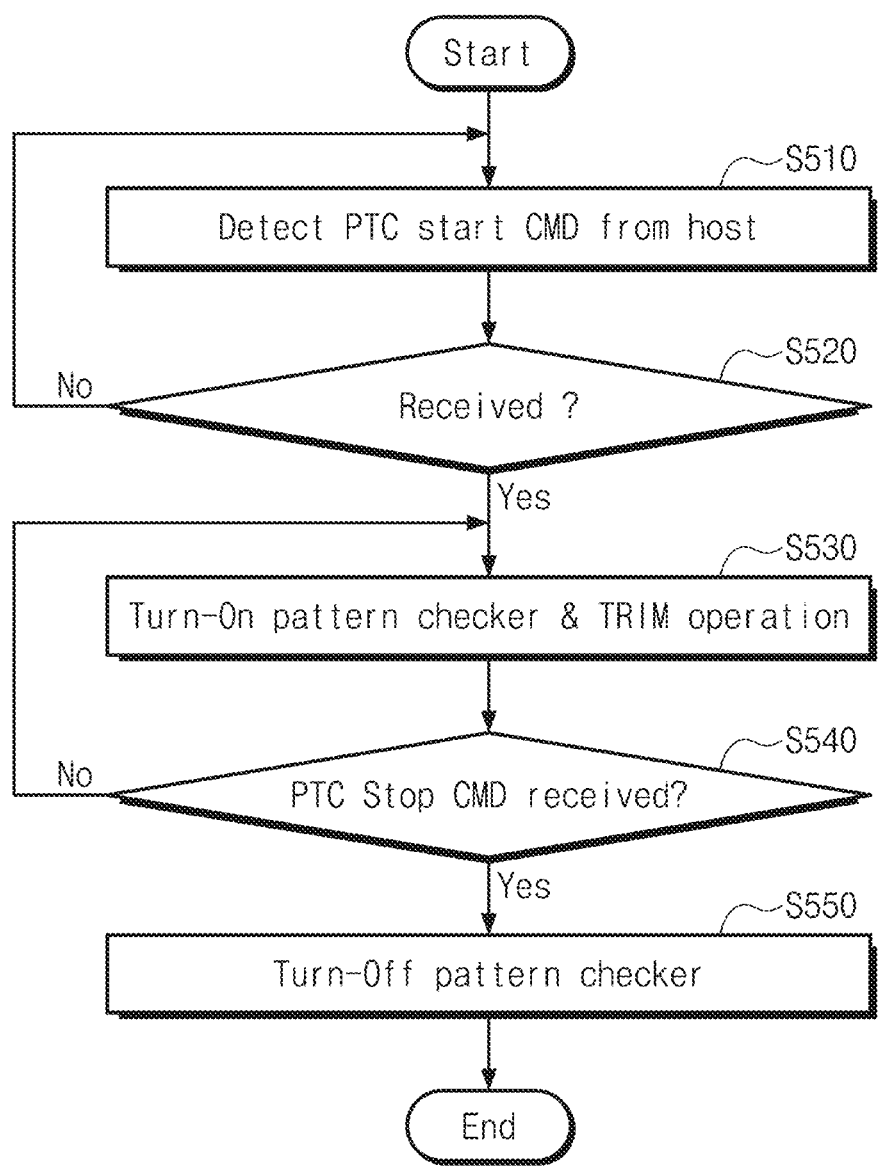
FIG. 14 is a flowchart illustrating a trim operation performed by a storage device of FIG. 12.

FIG. 14 is a flowchart illustrating a trim operation that is performed by a storage device of FIG. 12. Referring to FIG. 14, the storage device 230 may perform a trim operation based on the pattern check start command PTC Start CMD, the trim pattern TRIM_PTRN, and the pattern check stop command PTC Stop CMD that are provided from the host 210.

In operation S510, the storage device 230 may detect whether the pattern check start command PTC Start CMD is provided from the host 210.

In operation S520, if it is determined that the pattern check start command PTC Start CMD is received, the storage device 230 may perform operation S530. If it is determined that the pattern check start command PTC Start CMD is not received, the storage device 230 may move the process to operation S510.

In operation S530, the storage device 230 may turn on a pattern checker, which is included in the storage controller 231, in response to the pattern check start command PTC Start CMD. The pattern checker may be implemented with a hardware or software module. The trim operation of the storage device 230 may be activated according to activation of the pattern checker. The pattern checker may detect whether the trim pattern TRIM_PTRN provided from the host 210 is the same as a pattern defined in advance or chosen according to a rule. If the trim pattern TRIM_PTRN provided from the host 210 is the same as the pattern defined in advance or chosen according to a rule, the storage controller 231 may perform the trim operation on a memory area of the nonvolatile memory device 235 in which a trim pattern is stored. However, if the trim pattern TRIM_PTRN provided from the host 210 is not the same as the pattern defined in advance or chosen according to a rule, the storage controller 231 may not perform the trim operation.

In operation S540, the storage device 230 may detect whether the pattern check stop command PTC Stop CMD provided from the host 210 is received. If it is determined that the pattern check stop command PTC Stop CMD is received, the process may proceed to operation S550. If it is determined that the pattern check stop command PTC Stop CMD is not received, the process may return to operation S530.

In operation S550, the storage device 230 may turn off a function of the pattern checker. The storage device 230 may stop overall trim operations.

In FIGS. 11 to 14 described above, the host 210 may not generate the trim command but transmit a trim condition in the manner of transmitting control signals PCT Start and PCT Stop, which indicates a start and a stop of the trim operation, and data of the trim pattern TRIM_PTRN.

According to an example embodiment of the inventive concepts, a user device may provide a storage device with a trim command without depending on an operating system or a file system of a host. According to a trim management method of the inventive concepts, a trim scheme under controls of an application program and a device driver may be provided. Further, because a pattern check operation for performing a trim operation of a device driver is activated only when desired, versatility and power performance of the trim operation of the storage device may be improved.

As described above, some example embodiments are disclosed with reference to the drawings and specifications. Here, the terminology used herein is for the purpose of describing particular example embodiments only and is not intended to limit the inventive concepts. Therefore, it will be understood that various modifications and other equivalent example embodiments are possible from this point by those skilled in the art. The technical protection scope of the inventive concepts will be defined by the technical spirit of the appended claims.

What is claimed is:

1. A trim management method for a storage device, the method comprising:
   activating, by at least one processor configured by an application program, a pattern check function of a device driver;
   requesting, by the at least one processor configured by the application program, a file system to write a file of a specified pattern;
   converting, by the at least one processor configured by the file system, the file to management unit data of the storage device;
   transmitting, by the at least one processor configured by the file system, the management unit data to the device driver;
   checking, by the at least one processor configured by the device driver, whether a data pattern of the management unit data is same as the specified pattern; and
   transmitting, by the at least one processor configured by the device driver, a trim command for trimming a storage area corresponding to the management unit data, to the storage device based on results of the checking.

2. The method of claim 1, wherein the transmitting a trim command comprises:
   transmitting the trim command to the storage device to trim the storage area, to which the file system requests to write the management unit data, if the data pattern is same as the specified pattern.

3. The method of claim 1, wherein the transmitting a trim command comprises:
   transmitting a write command to the storage device to program the management unit data to the storage area if the data pattern is different from the specified pattern.

4. The method of claim 1, further comprising:
   deactivating, by the at least one processor configured by the application program, the pattern check function of the device driver.

5. The method of claim 4, wherein the transmitting a trim command is performed after the deactivating the pattern check function.

6. The method of claim 5, wherein the storage device includes a portable solid state driver (SSD).

7. The method of claim 1, further comprising:
   deactivating, by the at least one processor configured by the application program, the pattern check function of the device driver; and
   generating the trim command if the pattern check function is deactivated.

8. The method of claim 1, wherein the transmitting a trim command transmits the trim command by the device driver to the storage device through a universal serial bus (USB) port or a Thunderbolt port.

9. The method of claim 1, wherein the transmitting transmits the trim command based on the results of the checking, without obtaining address information from the file system.

10. A user device comprising:
    a host including one or more processors and a working memory, the working memory including an application program, a file system, and a device driver loaded thereon, the application program configuring the one or more processors to activate or deactivate a pattern check function of the device driver to generate a trim command and request the device driver to write specified data through the file system, the device driver configuring the one or more processors to generate the trim command if a pattern of the specified data provided from the file system while the pattern check function is active is same as a specified pattern, the one or more processors configured to,
    generate the trim command based on driving the application program, the file system, and the device driver, and
    transmit the trim command to a storage device in communication with the host; and
    the storage device configured to trim a selected memory area in response to the trim command.

11. The user device of claim 10, wherein the application program configures the one or more processors to request the file system to write a file having the specified pattern while the pattern check function of the device driver is active.

12. The user device of claim 11, wherein the file system configures the one or more processors to convert the file to the specified data corresponding to a management unit of the storage device and request the device driver to configure the one or more processors to write the specified data.

13. The user device of claim 10, wherein the device driver configures the one or more processors to generate a write command for writing the specified data in the storage device if the pattern of the specified data provided from the file system is different from the specified pattern while the pattern check function is active.

14. The user device of claim 10, wherein the storage device comprises:

a bridge controller configured to communicate with the host based on a first interface standard; and a SSD configured to communicate with the bridge controller based on a second interface standard.

15. The user device of claim 14, wherein the first interface standard comprises a USB standard or a Thunderbolt standard.

16. The user device of claim 14, wherein the second interface standard comprises a serial AT attachment (SATA) standard or a nonvolatile memory express (NVMe) standard.

17. The user device of claim 14, wherein the one or more processors configured by the device driver is configured to generate the trim command without obtaining address information from the file system.

* * * * *